(12) United States Patent
Lin et al.

(10) Patent No.: US 10,163,576 B2
(45) Date of Patent: Dec. 25, 2018

(54) CAPACITOR CATHODE FOIL STRUCTURE AND MANUFACTURING METHOD THEREOF

(71) Applicant: APAQ TECHNOLOGY CO., LTD., Miaoli County (TW)

(72) Inventors: Ching-Feng Lin, Hsinchu County (TW); Ming-Tsung Chen, Changhua County (TW)

(73) Assignee: Apaq Technology Co., Ltd., Miaoli County (TW)

( * ) Notice: Subject to any disclaimer, the term of this patent is extended or adjusted under 35 U.S.C. 154(b) by 0 days.

(21) Appl. No.: 15/414,963

(22) Filed: Jan. 25, 2017

(65) Prior Publication Data
US 2017/0133158 A1 May 11, 2017

Related U.S. Application Data

(63) Continuation-in-part of application No. 14/049,437, filed on Oct. 9, 2013.

(30) Foreign Application Priority Data

Feb. 6, 2013 (TW) .............................. 102104584 A

(51) Int. Cl.
| | |
|---|---|
| *H05H 1/24* | (2006.01) |
| *H01G 9/00* | (2006.01) |
| *H01G 9/042* | (2006.01) |
| *H01G 9/045* | (2006.01) |
| *H01G 9/048* | (2006.01) |
| *C23C 16/00* | (2006.01) |
| *B82Y 30/00* | (2011.01) |
| *B82Y 40/00* | (2011.01) |

(52) U.S. Cl.
CPC ............ *H01G 9/0029* (2013.01); *H01G 9/045* (2013.01); *H01G 9/048* (2013.01); *H01G 9/0425* (2013.01); *B82Y 30/00* (2013.01); *B82Y 40/00* (2013.01); *Y10S 977/948* (2013.01); *Y10T 29/302* (2015.01)

(58) Field of Classification Search
CPC ................................ C23C 16/26; B82Y 99/00
USPC ............................................ 427/248.1, 249.1
See application file for complete search history.

(56) References Cited

U.S. PATENT DOCUMENTS

| | | | | |
|---|---|---|---|---|
| 2009/0325071 | A1* | 12/2009 | Verbrugge | ............... C30B 25/00 429/219 |
| 2011/0033688 | A1* | 2/2011 | Veerasamy | .............. C30B 25/02 428/220 |
| 2013/0065034 | A1* | 3/2013 | Muramatsu | ........... H01B 13/321 428/213 |

OTHER PUBLICATIONS

Yu et al. Graphene segregated on Ni surfaces and transferred to insulators, App Phys Lett, 93, (2008), pp. 113103-1-113103-3. (Year: 2008).*

* cited by examiner

*Primary Examiner* — Kelly M Gambetta
(74) *Attorney, Agent, or Firm* — Rosenberg, Klein & Lee

(57) ABSTRACT

The instant disclosure relates to a manufacturing method of capacitor cathode foil structure, comprising the following steps. The first step is providing a base foil, subsequently inserting the foil into a reactor. The next step is executing a heating process for heat the base foil to a temperature region of 400° C. to 1000° C. The next step is directing a carbon containing precursor gas into the reactor. The last step is executing a cooling process for cooling the base foil to a temperature below 100° C. to deposit a graphene-based layer on one surface of the base foil, wherein the graphene- (Continued)

based layer is consisted of a plurality of graphene-based thin films in stacked arrangement.

10 Claims, 5 Drawing Sheets

CAPACITOR CATHODE FOIL STRUCTURE AND MANUFACTURING METHOD THEREOF

CROSS REFERENCE TO RELATED APPLICATION

This application is a continuation-in-part of U.S. application Ser. No. 14/049,437, filed on 9 Oct. 2013 and entitled "CAPACITOR CATHODE FOIL STRUCTURE AND MANUFACTURING METHOD THEREOF", now pending, the entire disclosures of which are incorporated herein by reference.

BACKGROUND OF THE INVENTION

1. Field of the Invention

The instant disclosure relates to an electrode foil; in particular, to a capacitor cathode foil structure and manufacturing method thereof.

2. Description of Related Art

Products with low-resistance aluminum electrolytic capacitor are mainstream products for electric equipment now and in the future. Generally speaking, capacitor includes an anode and a cathode. The anode foil is made of valve metal like aluminum or tantalum, the cathode foil is made of aluminum having a large surface area, and the cathode materials are selected from the group consisting of inorganic semiconductor, organic conducting material, or metal film, etc.

A fabricating method of aluminum electrolytic capacitor according to Taiwan Patent No. 403923 comprises the following steps: The first step is providing an aluminum foil, subsequently etching the aluminum foil to form a plurality of etching voids by utilizing an aluminum ion containing etching solution to enlarge the effective surface area. The next step is removing the impurities within the etching voids by utilizing a solution such as phosphoric acid, acetic acid, or sulfuric acid, etc. The last step is forming an oxidant film on the aluminum foil in direct current solution treatment utilizing a solution such as hexamethylene diamine, hypophosphorous amine.

However, there are disadvantages in the fabricating method said above. On the on hand, the fabricating method may produce the problems of large volumes of waste acid and high treating cost. On the other hand, said acid solution may cause surface oxidation of the aluminum foil to affect the electric property thereof.

In addition, another fabricating method of capacitor cathode foil according to a prior art is forming a metal film (ex. titanium film) on the aluminum foil through a PVD process. But the film intensity is not uniform, and surface property of the metal film is unstable under atmosphere. Therefore, cathode foils fabricated by said method cannot meet the requirement of products with aluminum electrolytic capacitor.

SUMMARY OF THE INVENTION

The object of the instant disclosure is to provide a capacitor cathode foil structure and manufacturing method thereof, the manufacturing method can certainly deposit a graphene-based layer on an aluminum foil such that the capacitor cathode foil structure has better conductivity.

In order to achieve the aforementioned objects, according to an embodiment of the instant disclosure, the manufacturing method of capacitor cathode foil structure comprises the following steps. The first step is providing a base foil, subsequently inserting the foil into a reactor. The next step is executing a heating process for heating the base foil to a temperature region of 400° C. to 1000° C. The next step is directing a carbon containing precursor gas into the reactor. The last step is executing a cooling process for cooling the base foil to a temperature below 100° C. to deposit a graphene-based layer on one surface of the base foil, wherein the graphene-based layer is consisted of a plurality of graphene-based thin films in stacked arrangement.

According to another embodiment of the instant disclosure, the manufacturing method of capacitor cathode foil structure comprises the following steps. The first step is inserting a base foil into a vacuum reactor having an anode and a cathode. The next step is directing a noble gas and a reactive gas into the vacuum reactor in order. The last step is generating glow discharge between the anode and the cathode to form a graphene-based layer on the base foil, wherein the graphene-based layer is consisted of a plurality of graphene-based thin films in stacked arrangement.

According to the above two manufacturing methods, the capacitor cathode foil structure comprises a base foil and a graphene-based layer. The graphene-based layer is formed on one surface the base foil, wherein the graphene-based layer is consisted of a plurality of graphene-based thin films in stacked arrangement.

Base on above, the graphene-based thin films have properties of low thickness, high hardness, high performance ion mobility, and low resistance, etc. Therefore, the capacitor cathode foil structure can achieve excellent electron conductivity to promote electric and mechanical property of the capacitors.

Furthermore, stability of electric property on the cathode surface can be promoted to increase the capacitance of the capacitor cathode structure.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Following will describe a capacitor cathode foil structure and manufacturing method thereof in detail base on the figures. Said capacitor cathode foil structure has better electric property and excellent electron conductivity. Capacitors with the capacitor cathode foil structures has better product yield.

First Embodiment

Figure 1:
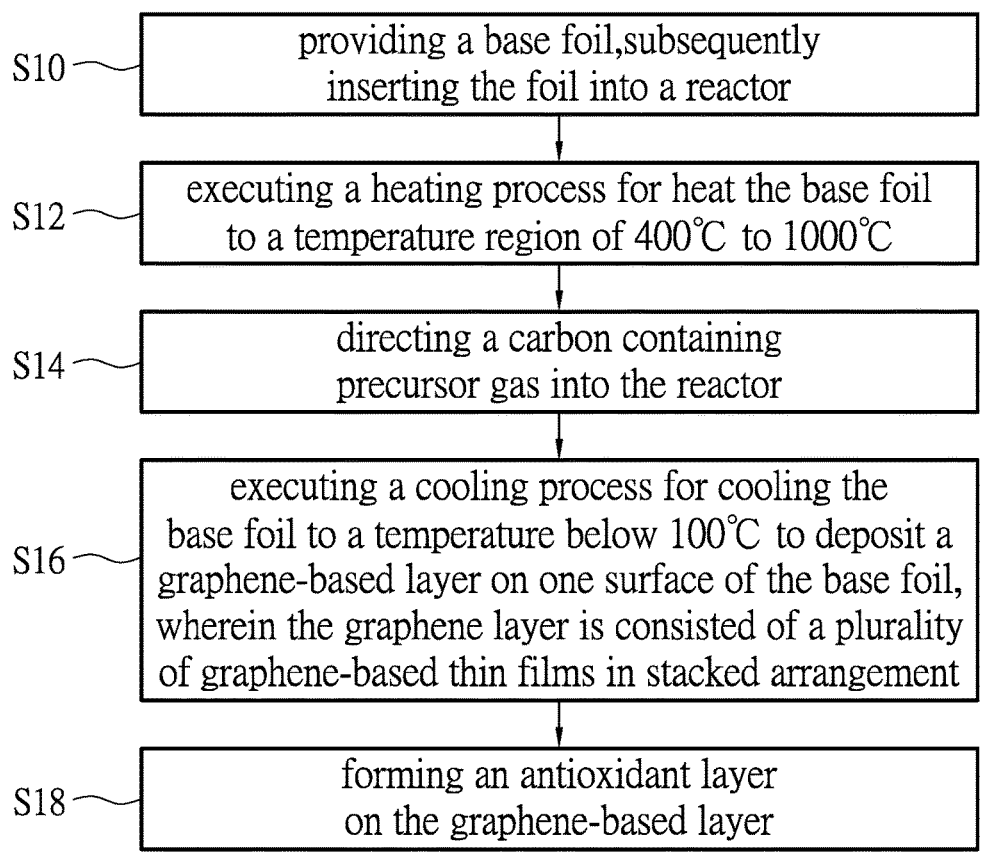
FIG. 1 shows a process diagram of a capacitor cathode structure according to an embodiment of the instant disclosure.

Please refer to FIG. 1, which shows a process diagram according to first embodiment of the manufacturing method of capacitor cathode foil structure. Specially, a graphene-based layer is formed by utilizing a CVD process of the manufacturing method.

The manufacturing method according to the first embodiment comprises the following steps. The first step is providing a base foil, subsequently inserting the foil into a reactor. The next step is executing a heating process for heating the base foil to a temperature region of 400° C. to 1000° C. The next step is directing a carbon containing precursor gas into the reactor. The next step is executing a cooling process for cooling the base foil to a temperature below 100° C. to deposit a graphene-based layer on one surface of the base foil, wherein the graphene-based layer is consisted of a plurality of graphene-based thin films in stacked arrangement. The last step is forming an antioxidant layer on the graphene-based layer. Following will describe the concrete technical features of each step in detail.

Figure 2:
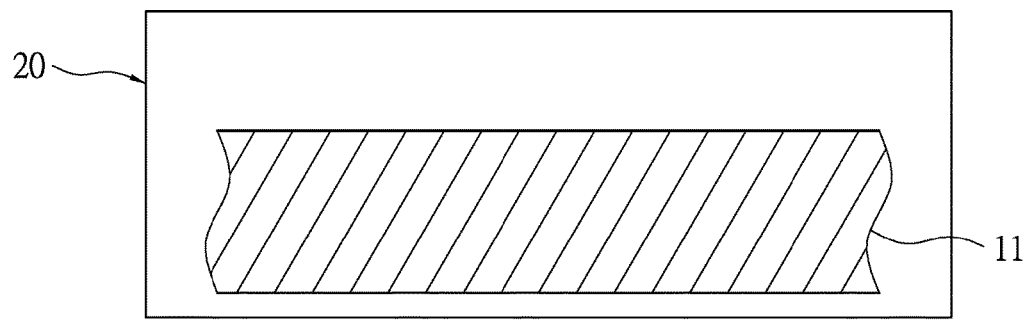
FIG. 2 shows a schematic diagram of a step of providing a base foil of a manufacturing method of a capacitor cathode structure according to an embodiment of the instant disclosure.

Please refer to FIG. 2, in step S10, the base foil 11 is an aluminum foil which is inserted into a reactor 20 (ex. CVD reactor) to carry out a subsequent CVD process. In various embodiments, the manufacturing method can further comprises executing a pretreating process before inserting the base foil 11 into the reactor 20 to remove the impurities on the surface of the base foil 11 by utilizing a oxidized acid solution. Furthermore, the base foil 11 may have a rough surface thorough an acid cleaning process, an etching process, or a sandblasting process before inserting the base foil 11 into the reactor 20.

In step S12, the base foil 11 is heated to a temperature region of 400 to 1000° C. for CVD process, preferably 450 to 660° C., more preferably in the range 550 to 630° C. The preferred heating time is in the region between 1 and 100 hours in the heating process, it can be fine-tuned according the temperature region.

Specially, the concentration of oxygen in the reactor 20 should be kept below 1.0 vol % to prevent the surface of the base foil 10 from oxidizing to increase the resistance at the interface. Therefore, the base foil 11 is heated to a temperature region of 400° C. to 1000° C. under oxygen-free atmosphere, protective atmosphere, or reducing atmosphere during the heating process. However, the temperature for heating the base foil 11 is not restricted to below 450° C. In this embodiment, the base foil 11 can be heated to a temperature at least more than 300° C.

In step S14, a carbon containing precursor gas is directed into the reactor 20 after the step 12. The carbon containing precursor gas is $C_xH_y$ gas, wherein x is $1 \leq x \leq 10$, y is $2 \leq y \leq 20$, such as acetylene gas, but not restricted thereto. The mass flow rate of the $C_xH_y$ gas stream ranges between 500 to 2000 sccm. In various embodiments, said carbon containing precursor gas may select from the group consisting of any hydrocarbons such as $CCl_4$ and $CH_2I_2$.

In particular, the carbon containing precursor gas stream should be directed into the reactor 20 in a time region ranges between 5 and 10 minutes, but are not limited to the mass flow rate. For example, said carbon containing precursor gas stream is directed into the reactor 20 with the mass flow rate control in a region of 10 to 10000 sccm, preferably 500 to 2000 sccm.

In addition, a dilution gas (ex. $H_2$, He, Ar, $NH_3$, or $N_2$) stream can be co-directed into the reactor 20 with the carbon containing precursor gas stream. The mass flow rate of the dilution gas stream is not restricted, considering that temperature and volume of the reactor and mass flow rate of the carbon containing precursor gas stream. Moreover, the reactor pressure should be maintained in a region between 10 mT to 500 Torr during gas flowing period.

Figure 3:
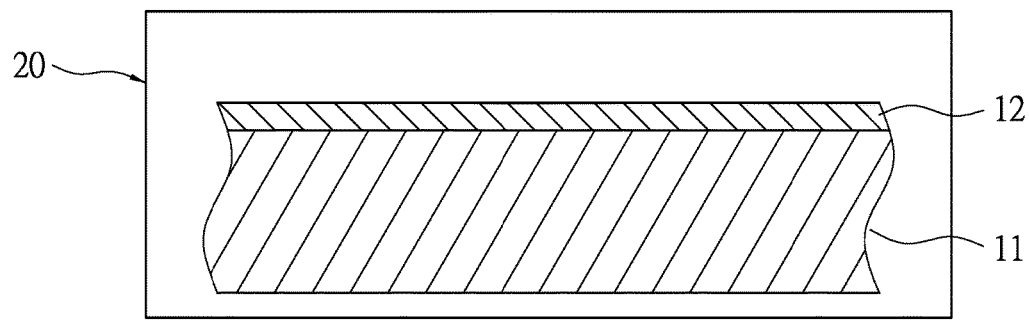
FIG. 3 shows a schematic diagram of a step of depositing a graphene-based layer on the base foil of a manufacturing method of a capacitor cathode structure according to an embodiment of the instant disclosure.
Figure 4:
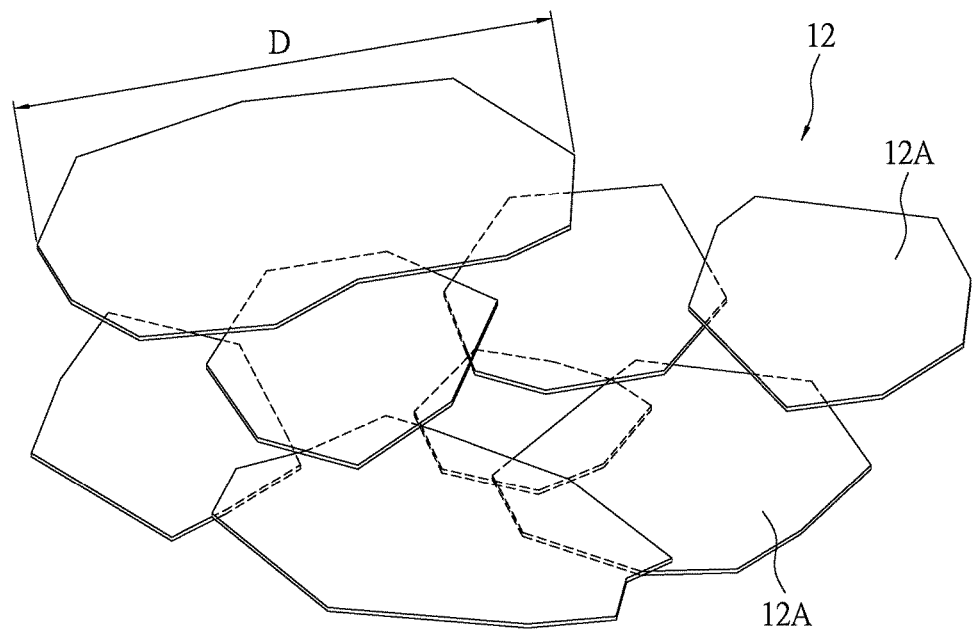
FIG. 4 shows a schematic diagram of a graphene-based layer of the instant disclosure.

Please refer to FIGS. 3 and 4, in step 16, executing a cooling process after step 14 to cool the base foil 11 to a temperature below 100° C., preferably 15 to 25° C. Therefore, a graphene-based layer 12 is formed on one surface of the base foil 11 during the cooling process.

Concretely speaking, said graphene-based layer 12 consists of a plurality graphene-based thin films 12A in stacked arrangement, wherein adjacent two graphene-based thin films 12A electrically connects to each other. In this embodiment, each of the graphene-based thin films 12A consists essentially of graphene and having small traces of carbon particles and nanotube, the film number is in a region between 2 to 1000, and the inner diameter of each of the graphene-based thin films ranges between 10 nm and 1 μm. Therefore, the thickness of the graphene-based layer 12 is in a region about 10 nm to 1 mm, and the resistance of the graphene-based layer 12 ranges between 0.01 Ω/sq to 10 Ω/sq such that the graphene-based layer 12 has high electron conductivity.

In various embodiments, the base foil 11 is inserted into another reactor, then heating the base foil 11 to a temperature above 1000° C. after the step 16 through a rapid thermal processing (RTP) in a range of about many milliseconds to helpfully form the graphene-based layer 12.

Figure 5:
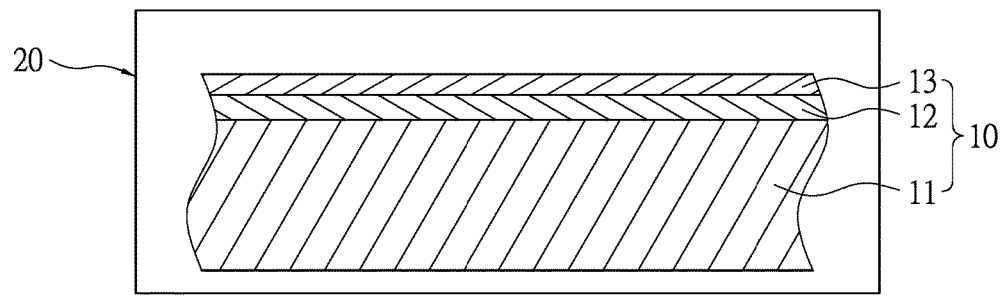
FIG. 5 shows a schematic diagram of a step of depositing an antioxidant layer on the graphene-based layer of a manufacturing method of a capacitor cathode structure according to an embodiment of the instant disclosure.

Please refer to FIG. 5, in step S18, forming an antioxidant layer 13 on the graphene layer 12 by controlling the deposition rate in another CVD process. The antioxidant layer 13 is made of a nitride, a carbide or a carbonitride of one of titanium (Ti), vanadium (V), chromium (Cr), zirconium (Zr), niobium (Nb), molybdenum (Mo), hafnium (Hf), Tantalum (Ta), tungsten (W) or an alloy thereof. The thickness of the antioxidant layer 13 should probably close in a region of 0.01 μm to 0.5 μm to raise the stability/quality of electric property on the surface of the base foil 11(C− cannot easily change from external environment impact as shown in expression I, wherein CT is total capacitance of aluminum electrolytic capacitor, C+ is capacitance of anode, C− is capacitance of cathode).

$$\frac{1}{CT} = \frac{1}{C+} + \frac{1}{C-}$$ (expression I)

Figure 7:
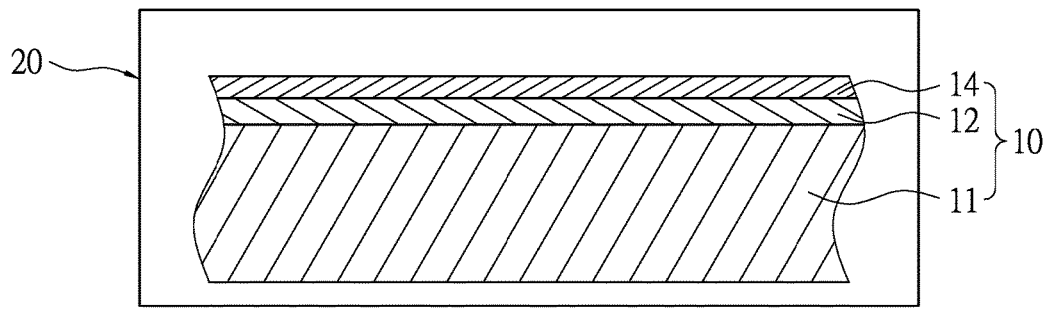
FIG. 7 shows a schematic diagram of the capacitor cathode foil structure according to an embodiment of the instant disclosure.

Referring to FIG. 7, a heat-dissipation layer 14 can be further formed on the graphene layer 12 for improving the stability of the capacitor. The heat-dissipation layer 14 is made of a nitride, a carbide or a carbonitride of one of titanium (Ti), vanadium (V), chromium (Cr), zirconium (Zr), niobium (Nb), molybdenum (Mo), hafnium (Hf), Tantalum (Ta), tungsten (W) or an alloy thereof. The heat-dissipation layer 14 can be formed by a CVD process.

Figure 8:
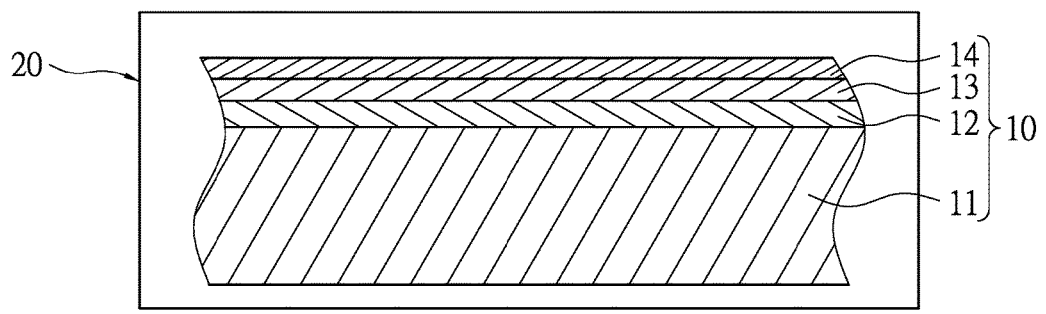
FIG. 8 shows a schematic diagram of the capacitor cathode foil structure according to another embodiment of the instant disclosure.
Figure 9:
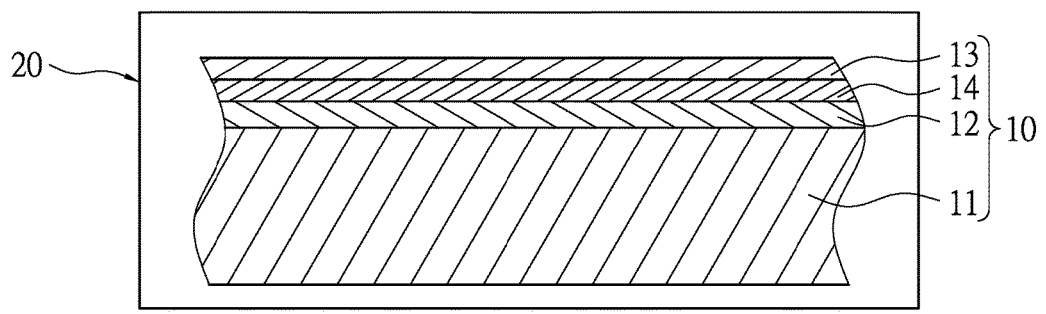
FIG. 9 shows a schematic diagram of the capacitor cathode foil structure according to yet another embodiment of the instant disclosure.

Please refer to FIG. 8 and FIG. 9. In the present invention, the antioxidant layer 13 and the heat-dissipation layer 14 can be formed on the graphene layer 12 in different order. In other words, in the capacitor cathode foil structure 10, the antioxidant layer 13 can be formed between the graphene layer 12 and the heat-dissipation layer 14 (as shown in FIG. 8), or the heat-dissipation layer can be formed between the graphene layer 12 and the antioxidant layer 13 (as shown in FIG. 9). By employing the antioxidant layer 13 and the heat-dissipation layer 14 on the graphene layer 12, the electrical performance of the capacitor using the capacitor cathode foil structure 10 is enhanced.

The present invention further provides a capacitor cathode foil structure 10 comprising a base foil 11, a graphene-based layer 12 and an antioxidant layer 13. The graphene-based layer 12 is disposed on one surface of the base foil 11 and consists of a plurality of graphene-based thin films 12A in stacked arrangement. The antioxidant layer 13 is disposed on the graphene-based layer 12. In particular, the graphene-based layer 12 is formed on one surface of the base foil 11 through a CVD or PVD process, the present invention is not restricted thereto.

The capacitor cathode foil structure 10 can further comprises a heat-dissipation layer 14 disposed on the graphene-based layer 12. In an implementation, the heat-dissipation layer 14 is disposed between the graphene-based layer 12 and the antioxidant layer 13. In another implementation, the antioxidant layer 13 is disposed between the graphene-based layer 12 and the heat-dissipation layer 14. In yet another implementation, the heat-dissipation layer 14 is directly formed on the graphene-based layer 12, while the capacitor cathode foil structure 10 does not comprise any antioxidant layer 13.

Specially, said graphene-based thin films have advantages of low thickness, high hardness, high performance ion mobility, and low resistance, etc. Therefore, the capacitor cathode foil structure can achieve excellent electron conductivity to promote electric and mechanical property of the capacitors. Therefore, the capacitor cathode foil structure 10 with the graphene-based layer 12 consisting of the graphene-based thin films can achieve excellent electron conductivity in conformity with the demand for miniaturization of the current electric device.

In addition, the graphene-based layer 12 is formed with a plurality voids by controlling the deposition rate during the deposition process (CVD or PVD) to increase its effective surface area to effectively transport electrons out to improve the static capacitance.

Second Embodiment

Figure 6:
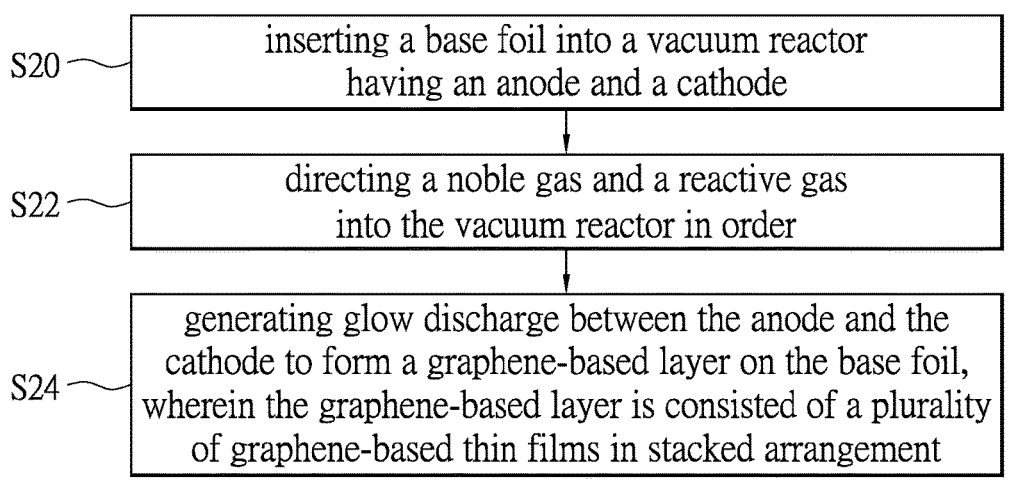
FIG. 6 shows a process diagram of a capacitor cathode structure according to another embodiment of the instant disclosure.

Please refer to FIG. 6, which shows a process diagram according to the second embodiment of the manufacturing method of capacitor cathode foil structure. Specially, a graphene-based layer is formed by utilizing a PVD process of the manufacturing method, comprising the following steps:

Step S20, inserting a base foil 11 into a vacuum reactor having an anode and a cathode. Step S22, directing a noble gas and a reactive gas into the vacuum reactor in order; Step S24, generating glow discharge between the anode and the cathode to form a graphene-based layer 12 on the base foil 11, wherein the graphene-based layer 12 is consisted of a plurality of graphene-based thin films 12A in stacked arrangement.

Concretely speaking, in step S22, said noble gas is selected from the group consisting of helium, neon, and argon, said reactive gas includes methane, nitrogen, and oxygen. However, the noble gas and the reactive gas both are not limited, said both can be selected according to process demand.

In step S24, both anode and cathode are in application of high-frequency of electric power to generate glow discharge between the anode and the cathode. Furthermore, the argon ions in the noble gas plasma is used to attack the reactive gas to generate reactive atoms, thereby forming the graphene-based layer 12 on the base foil 11 during a sputtering process in a temperature region of 200 to 300° C.

Base on above, the manufacturing method of capacitor cathode foil structure of the instant disclosure certainly can deposit a graphene-based layer on an aluminum foil. Because graphene has properties of high electron transporting rate, the graphene-based layer can effectively achieve high performance electron mobility. Therefore, the capacitor cathode foil structure with the graphene-based layer not only has excellent electric and mechanical property of the capacitors but miniaturization can also be achieved to fit the demand of current electric device.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A manufacturing method of capacitor cathode foil structure, comprising the following steps:
   providing a base foil, subsequently inserting the base foil into a reactor;
   executing a heating process for heating the base foil to a temperature region of 400° C. to 1000° C.;
   directing a carbon containing precursor gas into the reactor;
   executing a cooling process for cooling the base foil to a temperature below 100° C. to deposit a graphene-based layer on one surface of the base foil, wherein the graphene-based layer is consisted of a plurality of graphene-based thin films in stacked arrangement; and
   forming an antioxidant layer on the graphene-based layer, wherein the antioxidant layer is made of a nitride, a carbide or a carbonitride of one of titanium (Ti), vanadium (V), chromium (Cr), zirconium (Zr), niobium (Nb), molybdenum (Mo), hafnium (Hf), tantalum (Ta), tungsten (W) or an alloy thereof.

2. The manufacturing method of capacitor cathode foil structure according to claim 1, wherein the base foil is heated to a temperature region of 400° C. to 1000° C. under oxygen-free atmosphere, protective atmosphere, or reducing atmosphere during the heating process.

3. The manufacturing method of capacitor cathode foil structure according to claim 1, wherein the base foil is heated to a temperature region of 450° C. to 660° C. during the heating process ranges from 1 to 100 hours.

4. The manufacturing method of capacitor cathode foil structure according to claim 1, wherein the carbon containing precursor gas is CxHy gas, x is $1 \leq x \leq 10$, y is $2 \leq y \leq 20$, the mass flow rate of the CxHy gas stream ranges between 500 to 2000 sccm, and the CxHy gas stream being directed into the reactor in a time region of 5 to 10 minutes.

5. The manufacturing method of capacitor cathode foil structure according to claim 1, wherein the base foil is cooled to a temperature region of 15° C. to 25° C. during the cooling process, and the graphene-based layer formed in the cooling process is consisted of 2 to 1000 graphene-based thin films.

6. The manufacturing method of capacitor cathode foil structure according to claim 5, wherein the thickness of each of the graphene-based thin films ranges between 10 nm and 1 mm, and the inner diameter of each of the graphene-based thin films ranges between 10 nm and 1 μm.

7. The manufacturing method of capacitor cathode foil structure according to claim 1, further comprising: heating the base foil to a temperature above 1000° C. by rapid thermal processing after the step of forming the antioxidant layer.

8. The manufacturing method of capacitor cathode foil structure according to claim 1, further comprising: forming a heat-dissipation layer on the antioxidant layer.

9. A manufacturing method of capacitor cathode foil structure, comprising the following steps:
   inserting a base foil into a vacuum reactor having an anode and a cathode;
   directing a noble gas and a reactive gas into the vacuum reactor in order;
   generating glow discharge between the anode and the cathode to form a graphene-based layer on the base foil, wherein the graphene-based layer is consisted of a plurality of graphene-based thin films in stacked arrangement; and
   forming an antioxidant layer on the graphene-based layer, wherein the antioxidant layer is made of a nitride, a carbide or a carbonitride of one of titanium (Ti), vanadium (V), chromium (Cr), zirconium (Zr), niobium (Nb), molybdenum (Mo), hafnium (Hf), tantalum (Ta), tungsten (W) or an alloy thereof.

10. The manufacturing method of capacitor cathode foil structure according to claim 8, wherein the noble gas is selected from the group consisting of helium, neon, and argon, the reactive gas includes methane, nitrogen, and oxygen.

* * * * *